United States Patent
Cazoulat et al.

(10) Patent No.: US 12,025,688 B2
(45) Date of Patent: Jul. 2, 2024

(54) METHOD FOR LOCATING A GEOLOCATION BEACON

(71) Applicant: ORANGE, Issy-les-Moulineaux (FR)

(72) Inventors: Renaud Cazoulat, Chatillon (FR); Pierre Cussac, Chatillon (FR); Claudia Meza Balanta, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 122 days.

(21) Appl. No.: 17/116,441

(22) Filed: Dec. 9, 2020

(65) Prior Publication Data

US 2021/0173035 A1    Jun. 10, 2021

(30) Foreign Application Priority Data

Dec. 10, 2019   (FR) ........................ 1914018

(51) Int. Cl.
*G01S 1/00*  (2006.01)
*G01S 1/04*  (2006.01)
*G01S 1/06*  (2006.01)
*G01S 1/08*  (2006.01)
(Continued)

(52) U.S. Cl.
CPC .............. *G01S 1/0428* (2019.08); *G01S 1/06* (2013.01); *G01S 1/08* (2013.01); *H04W 4/029* (2018.02); *H04W 76/15* (2018.02)

(58) Field of Classification Search
CPC .... G01S 5/0027; G01S 5/0231; G01S 1/0428; G01S 1/06; G01S 1/08; G01S 19/34; H04W 76/15; H04W 52/02; H04W 52/0261; H04W 36/0083; H04W 36/30;
(Continued)

(56) References Cited

U.S. PATENT DOCUMENTS 5,635,940 A * 6/1997 Hickman ............ H04L 61/5084
                                                     455/457
6,067,044 A * 5/2000 Whelan ................. G08G 1/207
                                                     342/357.74
(Continued)

FOREIGN PATENT DOCUMENTS

KR    20090039263 A    4/2009
WO    2011033504 A1    3/2011
WO    2018109284 A1    6/2018

OTHER PUBLICATIONS

French Search Report dated Jul. 15, 2020 for corresponding French Application No. 1914018, filed Dec. 10, 2019.
(Continued)

*Primary Examiner* — Chuong P Nguyen
(74) *Attorney, Agent, or Firm* — David D. Brush; Westman, Champlin & Koehler, P.A.

(57) ABSTRACT

A method for managing the transmission of geographical locations from a geolocation beacon during the movement thereof. The method includes: defining a first reference communication network associated with a first value and with a reference frequency used for the transmission of the locations over the first network; locating the beacon in a second network during the movement thereof; obtaining a second value associated with the second network; comparing the first and the second value, and when the values differ, the method includes modifying the reference frequency for the transmission of the locations over the second network.

8 Claims, 3 Drawing Sheets

(51) Int. Cl.
*H04W 4/029* (2018.01)
*H04W 76/15* (2018.01)

(58) Field of Classification Search
CPC ... H04W 36/32; H04W 4/029; G06Q 10/0833
See application file for complete search history.

(56) References Cited

U.S. PATENT DOCUMENTS

| | | | | |
|---|---|---|---|---|
| 6,167,268 | A * | 12/2000 | Souissi | H04W 48/16 455/437 |
| 6,510,381 | B2 * | 1/2003 | Grounds | H04W 4/029 340/992 |
| 6,750,813 | B2 * | 6/2004 | Vargas-Hurlston | H04W 64/006 701/484 |
| 7,072,668 | B2 * | 7/2006 | Chou | G01S 19/48 455/461 |
| 7,405,655 | B2 * | 7/2008 | Ng | G08G 1/207 340/568.1 |
| 8,099,112 | B2 * | 1/2012 | Krishnamurthi | H04W 64/00 455/456.2 |
| 8,199,001 | B2 * | 6/2012 | Verbil | H04W 4/02 340/988 |
| 8,538,373 | B2 * | 9/2013 | Koontz | G06F 1/3278 455/404.1 |
| 8,774,827 | B2 * | 7/2014 | Scalisi | G01S 19/34 455/456.2 |
| 9,470,797 | B2 * | 10/2016 | Walgren | G01S 19/14 |
| 9,578,182 | B2 * | 2/2017 | Raleigh | H04L 12/14 |
| 2001/0034577 | A1 * | 10/2001 | Grounds | G07C 5/085 340/988 |
| 2002/0120394 | A1 * | 8/2002 | Rayne | G08G 1/20 340/988 |
| 2002/0177476 | A1 * | 11/2002 | Chou | G01S 5/0027 455/574 |
| 2002/0198980 | A1 * | 12/2002 | Najafi | H04W 48/18 709/224 |
| 2009/0315767 | A1 * | 12/2009 | Scalisi | G01S 19/34 342/357.74 |
| 2014/0248852 | A1 * | 9/2014 | Raleigh | H04W 12/068 455/566 |
| 2014/0375498 | A1 * | 12/2014 | McKethan | G01S 19/14 342/357.51 |
| 2016/0117904 | A1 | 4/2016 | Song et al. | |
| 2019/0236323 | A1 | 8/2019 | Trivelpiece et al. | |

OTHER PUBLICATIONS

English translation of the French Written Opinion dated Jul. 15, 2020 for corresponding French Application No. 1914018, filed Dec. 10, 2019.
Jian Ye et al., "A Comprehensive Resource Management Framework for next generation wireless networks", IEEE Transactions on Mobile Computing, IEEE Service Center, Los Alamitos, CA, US, vol. 1, No. 4, Oct. 1, 2002 (Oct. 1, 2002), pp. 249-264, XP011095550.

* cited by examiner

[Fig. 1]
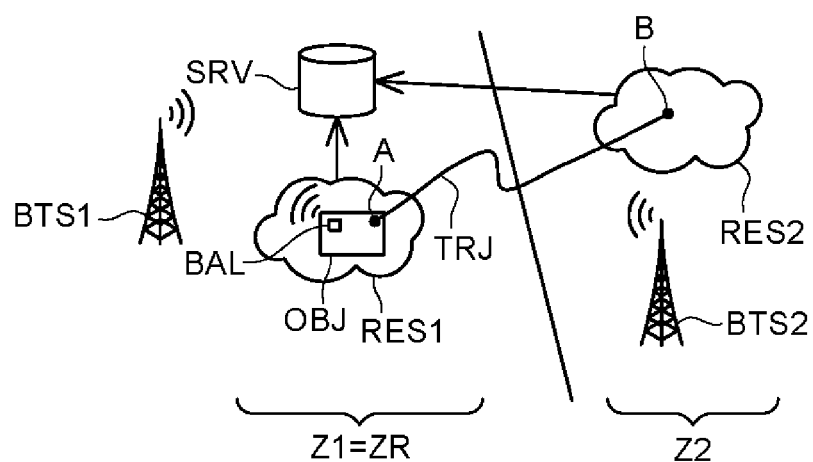
[Fig. 2]
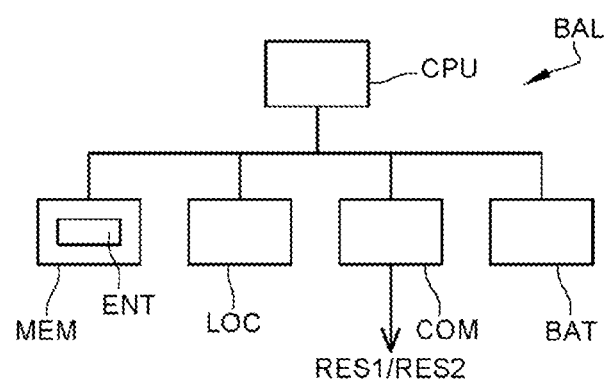

[Fig. 3]
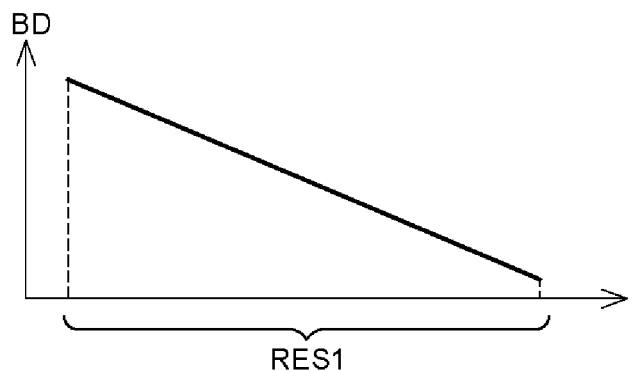
[Fig. 4]
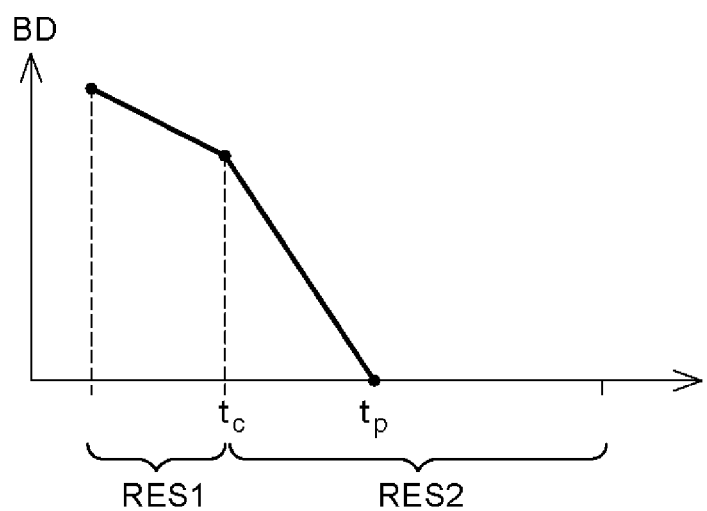
[Fig. 5]
| MCC | CNT | 4G | LTE-M |
|-----|-----|-----|-------|
| 208 | FR | 1,0 | 1,0 |
| 214 | ES | 1,0 | 1,0 |
| ... | ... | ... | ... |
| 404 | IN | 1,6 | 1,5 |
| 748 | UY | 3,4 | 3,4 |

[Fig. 6]
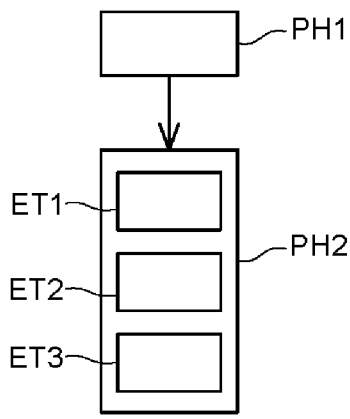
[Fig. 7]
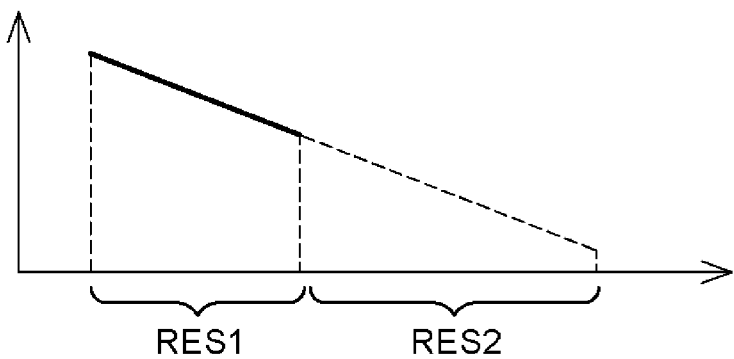
[Fig. 8]
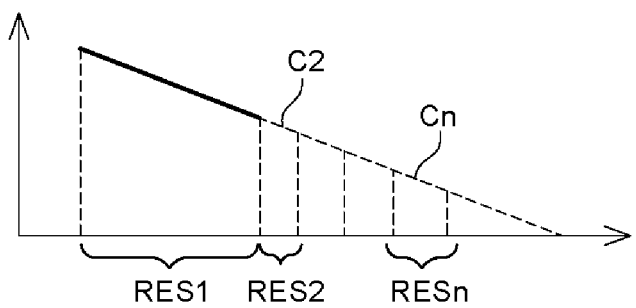

METHOD FOR LOCATING A GEOLOCATION BEACON

TECHNICAL FIELD

One or more embodiments of the invention pertain to the field of telecommunications.

More particularly, an embodiment relates to a method for managing the transmission of the location of a geolocation beacon, also called a tracking beacon.

PRIOR ART

The market for the Internet of beacons, also known in English as the Internet of Things, has seen exceptional growth, with respect to both private individuals and businesses. Most connected things are equipped with a (rechargeable) battery or a cell. Beacon battery life therefore a real limiting factor on the growth of such beacons.

In particular, geolocation beacons are widely used to locate and track things to which they are coupled during movements thereof. These beacons are attached to the thing or placed in the thing and periodically transmit geographical positions allowing the thing to be located and tracked during the movement thereof.

When a parcel is dispatched and it is desired to monitor its journey, a geolocation beacon is placed inside the parcel. During transport, the various beacons transmit, with a given frequency, their respective location information, for example their GPS position, to a tracking server.

Location transmission from a beacon costs money; specifically, the location is transmitted via a network of an operator which charges for the transmission of locations. In order to manage costs and above all simplify manufacturing processes, beacons will usually be associated with a maximum amount of data (generally expressed in gigabytes or GB), in this case a maximum number of location messages, to be used on the network (called a data bucket), for a given price. This maximum amount is allocated to the beacon in the form of a data plan for a given time period, for example two years. The beacon thus has a data budget that it cannot exceed for this period.

The problem is that the cost associated with the transmission of data differs from one network to another. This problem often arises when the beacon transitions from a first network in a first geographical region, called the reference region, to a second network for example in a second geographical region. Depending on the geographical region in which the beacon will be located, due to the variation in costs, sending a message will cost more or less. For example, if the cost per byte in a given geographical region is higher than the cost per byte in the reference region, the transmission of a message will cost more. This situation is problematic in that it may result in the beacon, while it is in movement, prematurely consuming all of the budget allocated to it. When this scenario occurs,

- either the operator blocks transmission because the plan is a capped plan, in which case the beacon ceases to transmit location messages; this solution is not desirable in terms of quality of service;
- or the operator allows transmission and charges for the messages transmitted out of plan; this solution is not desirable because it can become very expensive as the length of time considered increases, potentially being for example a year or more.

SUMMARY

An exemplary embodiment of the invention aims to improve the situation.

To this end, according to a functional aspect, an exemplary embodiment of the invention relates to a method for managing the transmission of geographical locations from a geolocation beacon during the movement thereof, characterized in that it comprises the following steps in the beacon:

- a prior step of defining a first reference communication network associated with a first value representative of a cost of transmission over the first network and with a reference frequency used for the transmission of the locations over the first network;
- a step of locating the beacon in a second network during the movement thereof;
- a step of obtaining a second value associated with the second network that is representative of a cost of transmission over the second network;
- a step of comparing the first and the second value, and when the values differ, the method comprises a step of modifying the reference frequency for the transmission of the locations over the second network.

Unlike the prior art in which each geolocation beacon transmits its location with a constant frequency, an exemplary embodiment of the invention proposes making the transmission frequency variable according to the network with which the beacon is communicating and a value associated with this network. By virtue of an exemplary embodiment of the invention, the beacon decreases, increases or maintains the number of location messages; as a result, since cost is related to the amount of data transmitted, an exemplary embodiment of the invention ensures, over a given duration, linear consumption, rather than consumption in increments which would lead to premature consumption of the budget allocated to the beacon.

It should be noted that a value may take a number of forms. A value corresponds to a binary datum, an alphanumeric datum, or any other similar data.

According to a first particular implementation of the invention, the modified frequency is maintained for as long as the beacon is located in the second network. The beacon therefore retains the modified frequency for as long as it is located in the second region and recalculates a new frequency on each transition into a new network.

According to another, second particular implementation of the invention, which could be implemented as an alternative or in addition to the previous implementation, the first value and the second value are representative of a cost of data transmission over the respective communication networks. This implementation aims to smooth the billing due to the use of a network regardless of the cost of data transmission over the network in question.

According to another, second particular implementation of the invention, which could be implemented as an alternative or in addition to the previous implementations, the beacon stores correspondences between codes and respective values, and in that the step of obtaining a second value consists in receiving a code relating to the network used from a network access device with which the beacon communicates and in retrieving the value that corresponds to the received code. The access device is for example a base station of a mobile network. In this implementation, the beacon uses a received code to identify the current network used and to determine the associated value, for example the cost of data transmission over this network.

According to another, third particular implementation of the invention, which could be implemented as an alternative or in addition to the previous implementations, if the second value is higher, the reference frequency is decreased. In this implementation, the number of location transmissions is decreased in order to compensate for the higher cost due to data transmission over the second network.

According to another, fourth particular implementation of the invention, which could be implemented as an alternative or in addition to the previous implementations, if the second value is lower, the reference frequency is increased. This decrease will allow the location to be transmitted more frequently without prematurely consuming the allocated budget.

According to another, fifth particular implementation of the invention, which could be implemented as an alternative or in addition to the previous implementations, if the second value is lower, the reference frequency is maintained. This implementation allows the beacon to consume no more of its battery and thus to maintain its battery life.

According to one hardware aspect, an exemplary embodiment of the invention relates to an entity for managing the transmission of geographical locations from a geolocation beacon during the movement thereof, characterized in that it comprises:
- a module for defining a first reference communication network associated with a first value representative of a cost of transmission over the first network and of a reference frequency used for the transmission of the locations over the first network;
- a module for locating the beacon in a second network during the movement thereof;
- a module for obtaining a second value that is representative of a cost of transmission over the second network;
- a module for comparing the first and the second value;
- a module for modifying the number of locations to transmit over the second network by the beacon over a given time period and when the values differ.

According to another hardware aspect, an exemplary embodiment of the invention relates to a geolocation beacon comprising a management entity such as defined above.

According to another hardware aspect, an exemplary embodiment of the invention relates to a computer program able to be implemented on a management entity such as defined above, the program comprising code instructions that, when it is executed by a processor, performs the steps of the method that are defined above.

An exemplary embodiment of the invention also relates to a data carrier on which at least one sequence of program code instructions for executing the method defined above has been stored.

The data carrier may be any entity or device capable of storing the program. For example, the carrier may include a storage means, such as a ROM, for example a CD-ROM or a microelectronic circuit ROM, or else a magnetic recording means, such as a hard disk. Moreover, the information carrier may be a transmissible carrier such as an electrical or optical signal, which may be routed via an electrical or optical cable, by radio or by other means. The program according to an exemplary embodiment of the invention may in particular be downloaded from an Internet network. As an alternative, the information carrier may be an integrated circuit in which the program is incorporated, the circuit being designed to execute or to be used in the execution of the method in question.

Lastly, it should be pointed out here that, in the present text, the term "module" or "entity" may correspond equally to a software component or to a hardware component or to a set of software and hardware components, a software component itself corresponding to one or more computer programs or subroutines or, more generally, to any element of a program able to implement a function or a set of functions such as described for the modules in question. In the same manner, a hardware component corresponds to any element of a hardware assembly able to implement a function or a set of functions for the module in question (integrated circuit, chip card, memory card, etc.).

BRIEF DESCRIPTION OF THE DRAWINGS

One or more exemplary embodiments of the invention will be better understood on reading the following description, given by way of example and with reference to the appended drawings, in which:

FIG. 1 shows a computer system on which an exemplary embodiment of the invention is illustrated.

FIG. 2 is a schematic view of the architecture of a geolocation beacon.

FIG. 3 illustrates the change in plan consumption when the beacon remains in a reference region.

FIG. 4 illustrates the change in plan consumption when the beacon transitions from a first geographical region into a second geographical region.

FIG. 5 illustrates a table including values associated with respective geographical regions.

FIG. 6 shows the various steps of the method of the invention according to one embodiment of the invention in the form of a flowchart.

FIG. 7 illustrates the change in plan consumption in a context similar to that of FIG. 4 and in which an exemplary embodiment of the invention is implemented.

FIG. 8 illustrates, in greater detail, the phase of adjusting the frequency of location transmission in which weighting coefficients are applied.

DETAILED DESCRIPTION OF ONE OR MORE EXEMPLARY EMBODIMENTS ILLUSTRATING THE INVENTION

FIG. 1 shows a system SYS comprising a geolocation beacon of tracking-beacon type BAL. In the present example, this beacon is associated with a thing to be transported; it may be for example affixed to the thing or located inside the thing. A thing is for example a parcel, a suitcase, a container, etc.

A beacon BAL makes it possible to obtain the position of the thing with which it is associated. The beacon transmits, with a given frequency, a datum representative of a location during the movement thereof throughout a journey TRJ. It is specified that the term frequency is a quantity related to a periodic phenomenon, which measures the number of times this phenomenon occurs in a given time period; for example, a message transmitted 10 times in one day is transmitted with a frequency of 10 messages per day at regular intervals.

In the present example, the beacon BAL is capable of communicating with a server which receives the locations. The location of the beacon makes it possible to locate the thing with which it is associated.

With reference to FIG. 2, a beacon BAL has a hardware architecture of a conventional computer. It comprises in particular a processor CPU, a random-access memory of RAM type (not shown in the figure) and a read-only memory MEM such as a memory of flash, ROM, etc. type.

The beacon BAL is capable of transmitting data via a network managed by an operator. In the present example, the operator is a telecommunications operator which charges for the use of its network to transmit and/or receive data.

The beacon BAL comprises a communication module COM for communicating with a network RES1/RES2. This communication module COM is capable of transmitting data to a remote tracking server SRV via a network, for example a network mobile of 5G type which is illustrated by means of an antenna BTS1/BT2 in FIG. 1. The beacon BAL is further, in the present example, equipped with a battery BAT in order to be supplied with electrical power. It is recalled here that the invention is not limited to beacons supplied with power by a battery but extends to all beacons regardless of the electrical power source used.

A beacon also comprises a location module LOC, the function of which is to obtain a location datum representative of the location of the beacon, and implicitly of the thing OBJ with which it is associated. In our example, the location module LOC is a geolocation module (for example of GPS, for Global Positioning System, type). The location datum may also be a postal address, etc.

In the present example, the beacon BAL periodically transmits its position via the network to which it is connected. This beacon BAL will be moved from a point A located in a first geographical region Z1, called the reference region, to a point B of a second geographical region Z2.

The regions comprise respective telecommunication networks RES1/RES2 managed for example by telecommunication operators which provide data plans for the use of their respective networks for a given period. The given period is generally a few months.

The plan taken with the first operator, called the reference operator, comprises for example a volume of data commonly called a data bucket by those skilled in the art for a given price. The volume of data corresponds to a maximum number of location messages to be transmitted over the given duration; in the present example, the plan results in a transmission cost. The cost is for example the cost of a single message, called the unit cost hereinafter. The invention is not limited to this example; the transmission cost considered could have been a subscription cost, or the like.

In the present example, a prepaid plan for an amount of data is allocated to the beacon. In the present example, the target plan is linked to a given geographical region called the reference region ZR. This reference region is for example France.

In this reference region ZR, the successive locations of the beacon are transmitted with a given frequency.

As indicated above, roaming agreements are made between geographical regions Z1 and Z2. The unit cost linked to the cost of transmission of a location, and implicitly of the message including the location, will therefore vary depending on the network used in the geographical region in question. When the beacon enters a geographical region that includes a network associated with a unit cost higher than the unit cost of the reference network, the transmission of a message costs more. A first consequence is that the beacon is charged extra; a second consequence is that the beacon consumes the budget allocated thereto faster than expected. The allocated budget will therefore be consumed prematurely.

Two cases will be presented below to illustrate the consequences of extra cost.

A first case illustrated in FIG. 3 targets the case in which the beacon moves within the same reference region ZR and communicates via a reference network RES1. A coordinate system is shown in this figure with the duration as the abscissa and the plan as the ordinate. It can be seen that the plan decreases linearly from the first time of use of the plan until a second time representative of the expected period of end of use of the beacon. This period has for example an expected duration of a month or of a year.

A second case is illustrated in FIG. 4, in which the beacon BAL transitions from the reference network RES1 to a second network RES2 which is located in a second geographical region Z2. As a result of the differences between unit costs of the different networks, as explained above, the allocated budget decreases more rapidly. Specifically, as soon as the beacon communicates via the second network RES2, since the unit cost is higher than the unit cost of the reference region and for the same number of messages transmitted (same frequency), the budget decreases more rapidly. This consumption, which is not linear but incremental, will lead to:

premature consumption of the plan at time tp if the unit cost of transmission of a location in the second network is higher than the unit cost in the reference region ZR; this case is illustrated in FIG. 4.

or, conversely, a plan that is not used up completely if the unit cost of transmission of a location is lower in the second region than in the reference region ZR.

To ensure optimal use of the budget BD allocated in the reference region, an exemplary embodiment of the invention adjusts the behavior of the beacon. More particularly, an entity ENT present in the beacon adjusts the frequency of transmission of the location according to the network used, more particularly to a value representative of the unit cost linked to the transmission of a location over the network used. The scenario in which a value CU1 is linked to the first network and a value CU2 is linked to the second network is used here. The values CU1 and CU2 are representative of the cost of transmission over the network used.

An exemplary embodiment of the invention comprises the following steps:

a prior step of defining a first reference communication network ZR associated with a first value CU1 representative of a cost of transmission over the first network and with a reference frequency used for the transmission of the locations over the first network;

a step of locating the beacon in a second network during the movement thereof;

a step of obtaining a second value CU2 that is representative of a cost of transmission over the second network;

a step of comparing the first CU1 and the second CU2 value, and when the values differ, the method comprises a step of modifying the reference frequency for the transmission of the locations over the second network.

Next, the entity ENT compares the values CU1 and CU2 of the reference network RES1 and of the network RES2, respectively.

The new value of the frequency of transmission of the location will be chosen so as to ensure transmission of the location over a given duration, for example the expected duration of use of the beacon (two years for example), and avoid premature consumption of the entire plan.

If, however, the values are such that the plan will not be consumed entirely by the end of the plan:

either the frequency is maintained;

or the frequency is increased so as to consume the entirety of the plan and increase the quality of the location service by transmitting the location more often.

When a plan is allocated to a beacon for a determined duration T, a management entity ENT present in the beacon will perform a calculation which consists in calculating the number N of locations to transmit according to the value CU associated with the network of the region in question.

A number of location data transmissions possible per day will be calculated knowing the volume of data (VD) linked to the transmission of a location, and implicitly of the message that includes the location, in the geographical region in question.

The number of transmissions per day is therefore $$BD/(T \times VD)$$

where "/" denotes the division sign,
"×" denotes the multiplication sign.

For example, a GPS beacon operating with a network of LTE-M (acronym for Long Term Evolution-CategoryMachine) type, known to those skilled in the art, will transmit its position at regular intervals. It is assumed that the beacon has a volume of data (also called a data bucket by those skilled in the art) that is fixed in terms of volume of data, for example 20 MB (megabytes), for a duration T of two years. It is also assumed that the transmission of a location corresponds to a volume of 2 KB per transmission. The data values given above result in a number N of location transmissions per day given by the formula:

$$N=20000/(365 \times 2 \times 2)=13$$

Namely, since a day comprises 24 hours, one transmission every two hours will be satisfactory for transmitting the location.

As seen above, entering a geographical region other than the reference region may have an impact in terms of financial cost.

To overcome this problem, an exemplary embodiment of the invention proposes varying the frequency of transmission of the location of the beacon BAL1 according to a value linked to the network used. To this end, the beacon, or more specifically the entity ENT present in the beacon, has relevant data relating to different geographical regions, and implicitly to different telecommunication networks, which might be used by the beacon.

The relevant data include all or some of the data shown in FIG. 5.

The table indicates, for different geographical regions (FR, ES, . . . , IN, UY), the corresponding region identifier MCC (208, 214, . . . 748) for each network of the region, for example the 4G and LTE-M networks, a weighting coefficient representative of a cost linked to the transmission of data over this network with respect to the reference network RES1. For example in the table, for the country FR, which is the reference geographical region ZR, the weighting coefficients are 1.0 and 1.0. For the region ES, the coefficients are the same, which means that the unit cost of a message is the same as in France. However, for the region UY, the weighting coefficients are 3.4 and 3.4, respectively. The weighting coefficients are dependent on roaming agreements between the reference region RES1 and the other regions in question. The advantage of using such weighting coefficients to calculate the number of location messages per day in each region through which the beacon BAL passes will be explained below.

The weighting coefficients defined above aim to modify the number of locations transmitted over a given period so as to ensure the transmission of the location over a given duration without additional cost. Depending on the geographical region, the frequency will therefore be decreased or increased so as not to exceed the allocated budget. For example, in a geographical region in which the roaming agreements are advantageous, the beacon will be able to increase the frequency of transmission of its location. Conversely, in a geographical region in which the roaming agreements are disadvantageous, the beacon will decrease the frequency of transmission of its location. The changes in frequency will be based on the weighting coefficients introduced above.

FIG. 6 illustrates the steps of one embodiment of the method of the invention.

On initialization, the code instructions of the computer program are for example loaded into a memory, before being executed by the processor CPU. The processor CPU of the processing unit implements in particular the following phases and steps:

In a first phase PH1, the beacon moves in the reference region RES1, for example the region FR with reference to FIG. 5.

In a second phase PH2, the beacon moves and in the course of its journey TRJ, the beacon enters another region Z2, for example the region IN whose weighting coefficients are 1.6 and 1.5 for the 4G and LTE-M networks, respectively.

The following steps are performed in this second phase:

In a first step ET1, the beacon connects to a radio antenna of a network of the region IN, for example the LTE-M network, and retrieves the MCC (Mobile Country Code) of this network from the base station BTS.

The entity ENT next verifies in the memory, in a second step ET2, the weighting coefficients associated with this region IN for the network LTE-M, namely 1.5, and uses the following formula to define the number of location transmissions per day:

$$BD/(T \times VD \times CP)$$

CP denotes the weighting coefficient to be applied.

In the present example, assuming the same values as above, namely a volume of data of 20 MB (megabytes), a duration of two years and a volume of 2 KB per transmission, and a weighting coefficient of 1.5, the calculation gives:

$$20000/(365 \times 2 \times 2 \times 1.5)=9.$$

Therefore, nine transmissions per day instead of 13 will now be performed. The new frequency is implemented in a third step ET3. This decrease in the frequency will thus compensate for the extra cost linked to the transmission of data over this second network due to less advantageous roaming agreements.

Next, it is assumed that the beacon returns to the region FR. The frequency is modified again and returns to the value linked to the reference region, namely 13 message transmissions.

FIG. 7 illustrates the change in consumption of the allocated budget with time. As shown in this FIG. 7, by virtue of an exemplary embodiment of the invention, the change is linear, like in FIG. 3, despite the variation in unit costs. The dashed portion corresponds to the second phase PH2.

FIG. 8 gives an example of a journey made while passing through a plurality of networks RES1-RESn included in various geographical regions. In this configuration, in the second phase, a plurality of calculations are performed with the weighting coefficients in question C1-Cn. The budget will decrease linearly even though the cost is variable. Throughout its movements, the thing will therefore constantly adjust its operation by varying the periodicity of transmission of the location in order to observe a linearity of budget consumption as indicated above.

According to one possible variant of the method, the beacon receives the weighting coefficients only for those regions which form part of the journey TRJ. This information is updated over time.

The invention claimed is:

1. A method for managing transmission of geographical locations from a geolocation beacon during movement thereof, a prepaid plan for an amount of data being allocated to the beacon for a given duration, wherein the method comprises the following acts performed by the beacon:
   a prior act of defining a first reference communication network associated with a first value representative of a financial cost of transmitting a location over the first reference communication network and with a reference frequency at which successive geographical locations are transmitted over the first reference communication network;
   locating the beacon in a second network during the movement of the beacon;
   storing correspondences between codes and respective values;
   receiving a code relating to the second network from a network access device with which the beacon communicates;
   obtaining a second value associated with the second network that is representative of a financial cost of transmitting a location over the second network by retrieving from the stored correspondences the second value that corresponds to the received code; and
   comparing the first and the second values, and in response to the second value being greater than or less than the first value, calculating a new reference frequency as a function of the financial cost over the second network and modifying the reference frequency to the new reference frequency at which successive geographical locations are transmitted over the second network in order not to exceed said prepaid plan.

2. The method according to claim 1, wherein the new frequency is maintained for as long as the beacon is located in the second network.

3. The method according to claim 1, wherein the beacon stores correspondences between codes and respective values, and the obtaining the second value comprises receiving a code relating to the second network from a network access device with which the beacon communicates and retrieving the second value that corresponds to the received code.

4. The method according to claim 1, wherein in response to the second value being higher than the first value, the reference frequency is decreased.

5. The method according to claim 1, wherein in response to the second value being lower than the first value, the reference frequency is increased.

6. An entity for managing transmission of geographical locations from a geolocation beacon during movement thereof, a prepaid plan for an amount of data being allocated to the beacon for a given duration, wherein the entity comprises:
   a processor; and
   a non-transitory computer-readable medium comprising instructions stored thereon which when executed by the processor configure the entity to:
   define a first reference communication network associated with a first value representative of a financial cost of transmitting a location over the first reference communication network and of a reference frequency at which successive geographical locations are transmitted over the first reference communication network;
   locate the beacon in a second network during the movement of the beacon;
   store correspondences between codes and respective values;
   receive a code relating to the second network from a network access device with which the beacon communicates;
   obtain a second value that is representative of a financial cost of transmitting a location over the second network by retrieving from the stored correspondences the second value that corresponds to the received code;
   compare the first value and the second value; and
   in response to the second value being greater than or less than the first value, calculate a new reference frequency as a function of the financial cost over the second network and modify the reference frequency to the new reference frequency at which successive geographical locations are transmitted over the second network in order not to exceed said prepaid plan.

7. The entity according to claim 6, wherein the entity is comprised in the geolocation beacon.

8. A non-transitory computer-readable medium on which at least one sequence of program code instructions for executing a method is stored, which when executed by a processor of a geolocation beacon configure the geolocation beacon to:
   manage transmission of geographical locations from the geolocation beacon during movement thereof, by:
   defining a first reference communication network associated with a first value representative of a financial cost of transmitting a location over the first reference communication network and with a reference frequency at which successive geographical locations are transmitted over the first reference communication network;
   locating the beacon in a second network during the movement of the beacon;
   storing correspondences between codes and respective values;
   receiving a code relating to the second network from a network access device with which the beacon communicates;
   obtaining a second value associated with the second network that is representative of a financial cost of transmitting a location over the second network by retrieving from the stored correspondences the second value that corresponds to the received code; and
   comparing the first and the second values, and in response to the second value being greater than or less than the first value, calculating a new reference frequency as a function of the financial cost over the second network and modifying the reference frequency to the new reference frequency at which successive geographical locations are transmitted over the second network in order not to exceed a prepaid plan for an amount of data allocated to the beacon for a given duration.

* * * * *